United States Patent Office 3,519,255
Patented July 7, 1970

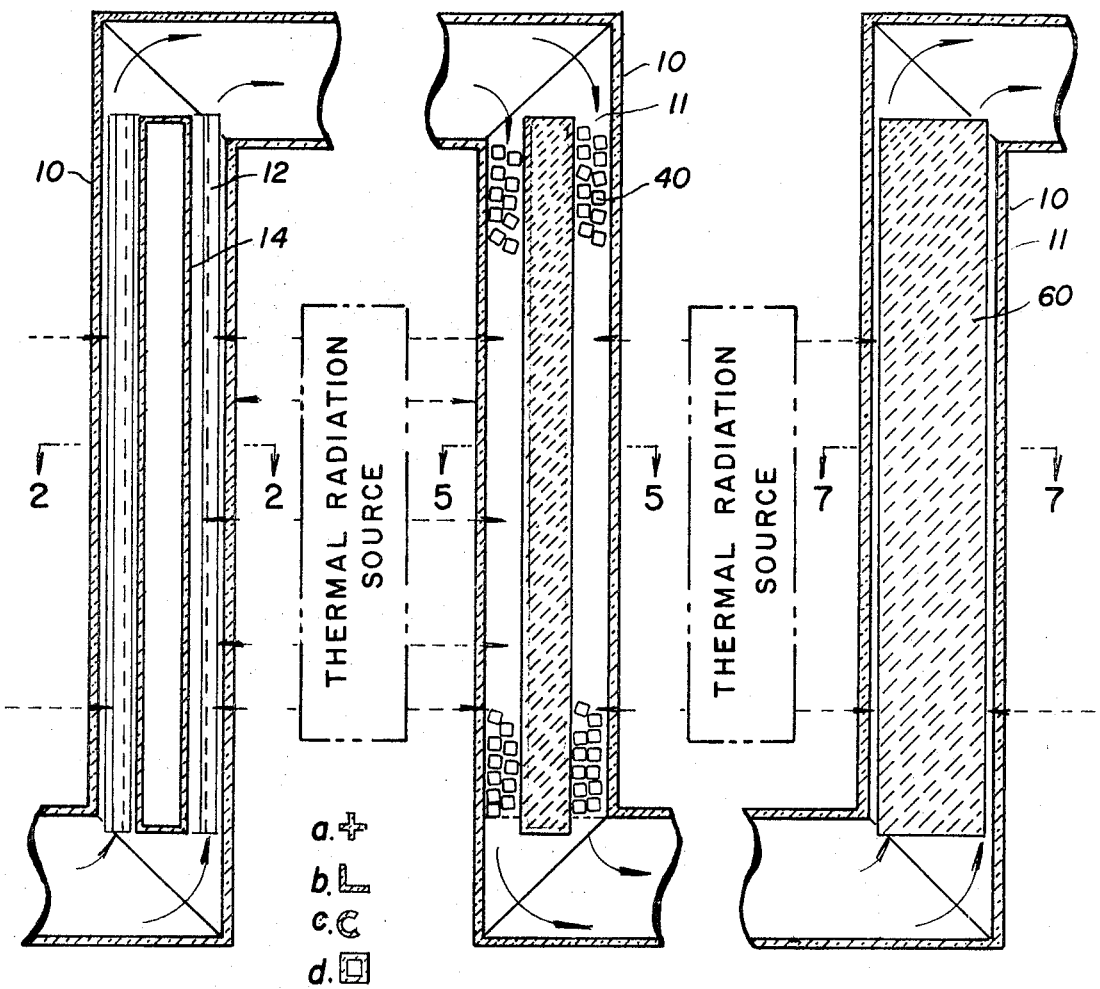

3,519,255
STRUCTURE AND METHOD FOR HEATING GASES
Hal B. H. Cooper, 4234 Chevy Chase Drive,
Pasadena, Calif. 91103
Continuation-in-part of application Ser. No. 749,005,
July 31, 1968. This application Mar. 27, 1969, Ser.
No. 812,562
Int. Cl. F23l 15/04
U.S. Cl. 263—20                                   40 Claims

ABSTRACT OF THE DISCLOSURE

A furnace particularly suitable for the heating of a corrosive gas stream, which furnace has an annular heating zone having for its outer wall a fused quartz conduit and a corrosion-resistant inner wall, with the gas flowing through the annular space. In a preferred embodiment, the furnace employs a substantially radiation-transparent fused quartz tube for its outer wall and the annular heating zone houses a plurality of radiation-absorbing surfaces provided by a structure (e.g., Raschig rings) open to the flow of the gas stream being heated.

The advantage of the use of the annular heating zone in avoiding the existence of a core of cooler gas along the center portion of the tube is also applicable to furnace structures utilizing an outer radiation-absorbing (translucent) fused quartz tube, with or without a plurality of radiation-absorbing surfaces within the annular heating zone.

---

This application is a continuation-in-part of copending application Ser. No. 749,005, filed July 31, 1968, now abandoned.

BACKGROUND OF THE INVENTION

Field of the invention

This invention relates to improvements in method and structure for the heating of corrosive materials to elevated temperatures.

The heating of corrosive materials such as the halogens and volatile inorganic halides in metal is generally limited to temperatures not exceeding 500° C. because of attack of the heat transfer tubes and contamination of the material being heated. For processes which require heating above this temperature level, fused quartz, or fused silica, as it is more commonly known, is frequently used. It has very desirable corrosion resistant properties but, as a material of construction, has certain limitations.

Fused quartz (silica) is available as an amorphous or non-crystalline glass which can be fabricated in various shapes, such as tubes, rods, pipe, tanks, vessels, plate, dishes, crucibles and general laboratory ware. It is available in either a clear or translucent (sometimes described as opaque) form. Both varieties have a high silicon dioxide content, usually in excess of 99.8 percent.

The translucent variety usually contains a somewhat higher impurity content and frequently contains a large amount of tiny bubbles within its body and one or both its surfaces may be roughened from the shaping or finishing operation, e.g., sand, satin or glazed finish. The clear (transparent) variety of fused quartz, generally, is essentially clear of bubble and both surfaces are smooth. The clear type is decidedly stronger than the translucent type, being of the order of 5 times stronger, which can be of considerable importance in the design and operation of large industrial structures built of fused quartz.

One of the properties of certain molecules, such as boron trichloride, titanium tetrachloride, aluminum chloride, silicon tetrachloride, chlorine and oxygen is that they are symmetrical in structure and have a low radiation absorptivity, that is, thermal radiation largely passes through and is not absorbed and converted to sensible heat. Coupled with this is the fact that clear quartz also is a poor radiation absorbing material, in fact, it is an excellent transmitter of radiation over a fairly wide spectrum. In the wave length range of 0.2 to 2.5 microns, which includes visible light and a major portion of the thermal radiation in the infra-red band, transmission is above 95 percent.

Further, both clear and translucent fused quartz or silica, have a low thermal conductivity, particularly when compared to metals. This characteristic, therefore, results in low rates of heat transfer and a very large heat transfer surface being needed when the heat to be transferred to the fluid being heated must transfer through a fused quartz wall.

In addition, fused quartz devitrifies at an accelerated rate with increase in temperature level. For example, at 1450° C. devitrification can occur in a short time. This problem can cause serious difficulties where the gas stream is being heated to around 1000° C. and the quartz wall must, accordingly, be at a higher temperature. Devitrification becomes an important consideration in the industrial use of fused silica as a material of construction, since only small temperature differentials can be tolerated, as otherwise the strength of the tube would deteriorate rapidly and failure would occur.

Description of the prior art

When faced with heating materials of low radiation absorptivity, such as titanium tetrachloride, silicon tetrachloride and the like, the methods of the prior have transferred the heat by conduction through a fused silica wall of low thermal conductivity and then to the gas stream mainly by forced convection from the inside surface of the heating duct. This has generally precluded the use of high strength clear fused quartz because it absorbs only a relatively small amount of the most abundant thermal radiation falling on the heating duct, and which would otherwise pass on through it and the fluid unabsorbed. Thus, in order to provide absorption of thermal radiation above that possible with clear fused quartz, the radiation-absorbing translucent variety has, accordingly, been used. The problem of possible divitrification has required the use of relatively low temperature differentials, which when combined with need for all of the heat to be transferred through the quartz by conduction with its low thermal conductivity, therefore, results in very large heat transfer areas.

It is apparent that there are many problems of design and operation, where materials of low radiation absorptivity must be heated and with fused quartz as a material of construction, which lead to a very high furnace investment and maintenance costs. The low rates of heat transfer attainable and low temperature differentials allowable make necessary sizeable heat transfer areas and large furnaces when contrasted with more conventional heating systems where metal heat transfer tubes may be employed.

The invention of my copending patent application Ser. No. 584,480, filed Oct. 5, 1966, now abandoned, shows an improved method for heating materials of low radiation-absorptivity. In this, an inner tube which is of a material which absorbs thermal radiation is located inside a fused quartz outer duct which is transparent to such thermal radiation. The transmitted radiation passes through the outer radiation-transparent duct wall and flowing gas, strikes the inner tube and is absorbed, thereby raising the temperature of the tube from which the heat is then exchanged both from the inside and outside to the fluid flowing therethrough. In that approach, the radiation-absorbing and heat exchange surface, however, is limited by the configurations involved and since heat transfer to the fluid is by conduction and convection, the amount of heat transferred is necessarily limited. Heat transfer by radiation is of a sharply higher order as it transfers as the fourth power of the absolute temperatures involved, whereas heat transfer by conduction and convection varies only as the first power of the difference in temperature and 0.8 power of the mass velocity. Since the heat transfer coefficient to the fluid is mainly a function of velocity of the fluid flowing, this therefore limits the diameter of the outer duct, which must be relatively small in diameter so as to obtain high velocities to give a reasonably high coefficient of heat transfer. As a result of the requirement for smaller diameter tubes there is thus less surface upon which the radiant energy can fall and, accordingly, considerably longer lengths of heating ducts and larger furnaces are needed as compared to the invention disclosed herein.

In my invention of Ser. No. 745,453, filed July 17, 1968, a further improvement has been made over the methods of the prior art and of the invention of my aforementioned Ser. No. 584,480 by sharply increasing the internal area for absorption of thermal radiation and heat transfer to the fluid being heated. This is accomplished by employment of a plurality of radiation-absorbing surfaces within the outer radiation-transparent tube made up of various structures, generally randomly disposed, such as Raschig rings and other types of packing that are open to the fluid being heated and which provide extensive radiation-absorbing and heat exchange surfaces. The concept is generally limited, as is that of Ser. No. 584,480, to relatively small diameter tubes, because of the fact that radiation penetrates only to a limited depth through the absorbing packing. This results in the fluid flowing in the outer regions of the packed tube being heated to a relatively high temperature while that flowing through the inner portion of the tube is heated to a lesser extent. While there is some lateral heat transfer through the packing and lateral mixing of the fluid, there is a general core of cooler fluid flowing at the center of the tube. This lowers the efficiency of the concept and while it is a marked improvement over the prior art, it is nevertheless at a disadvantage compared to the subject invention.

The various furnace designs proposed heretofore including applicant's Ser. Nos. 584,480 and 745,453 and still earlier designs have all necessarily employed relatively small diameter fused quartz conduits because there is an optimum diameter for each design beyond which an increase in size results in a loss of efficiency and lowering of temperature to which the gas stream may be heated. It will be appreciated that the diameter of the fused quartz conduit has a direct bearing on the radiant energy received per unit length of heating duct, that is to say, the larger the diameter the greater the external surface exposed and receiving the available radiant energy. Because of the foregoing limiting factor, fused quartz tube furnaces have necessarily used tubes of relatively small diameter which have a low linear energy take-up ability, thus requiring exceptionally long heating conduits, usually placed in a serpentine configuration, which leads to large expensive furnace structures and high maintenance costs. The fused quartz conduits of the prior art characteristically have diameters in the range of four to eight inches. The furnace design of the invention is readily adaptable to fused quartz tubes in excess of these sizes.

SUMMARY OF THE INVENTION

The furnace structure of the invention features an annular heating zone having for its outer wall a fused quartz tube which may be either of the transparent or translucent varieties. Several advantages discussed below derive from the annular heating zone concept, all of which contribute to a significant shortening of the quartz tube conduit and accompanying reduction in furnace and maintenance costs.

The improved furnace structure of the invention includes in its preferred embodiment an outer, substantially radiation-transparent fused quartz tube which provides the outer wall of an annular heating zone, which zone houses a plurality of radiation-absorbing surfaces provided by structure open to the flow of the gas stream being heated. The radiation-absorbing structure may take various forms, including spaced, elongated rods (tubular or of solid cross section), preferably positioned to intercept and capture the maximum amount of direct radiation from the heating source and of reflected radiation from adjacent rods, and is disposed within the annular heating zone. In a still another embodiment, the radiation-absorbing surfaces are provided by packings such as Raschig rings, Lessing rings, spiral rings, cross partition rings, Berl saddles, Intalox saddles, spheres, cylinders, pieces and chunks.

The core-filling member which provides the inner wall of the annular heating zone may take various forms. The core member may be either a solid structure or a tubular structure of round, square or other shape which is blocked internally to forestall the flow of gas therethrough. Since little or substantially no radiant energy should reach the inner core member, it may be formed of either radiation-absorbing or radiation-transparent material. The core member blocks the flow of gas along the center portion of the fused quartz tube, thereby providing higher velocities within the heating zone wherein the bulk of the radiant energy is received and exchanged by the plurality of radiation-absorbing surfaces. Thus, it is seen that in the practice of the method of the invention the whole of the gas stream is more uniformly exposed to the heated radiation-absorbing surfaces, thereby improving the efficiency of the heating through the elimination of the core of unheated gas which would otherwise be flowing at the center of the heating conduit. The use of the annular heating zone permits the diameter of the outer fused quartz tube to be increased substantially and thereby proportionally increases the radiant energy received per unit length of heating duct. Additionally, the higher velocity of the gas stream through the annular heating zone provides an improved heat transfer coefficient to the gas being heated.

It will be recognized that the advantage of the use of the annular heating zone in avoiding the existence of a core of cooler gas along the center of the tube is also applicable to furnace structures utilizing an outer radiation-absorbing (translucent) fused quartz tube with or without a plurality of radiation-absorbing surfaces within the annular heating zone. Thus, the furnace structure of the invention in its broader sense comprises an outer fused quartz tube which may be either transparent or translucent quartz, which tube serves as the outer wall of an annular passageway for the gas stream being heated. A core-filling structure forms the inner wall of the gas passageway. The core-filling structure may be formed of the fused quartz of either the transparent or translucent variety and, in some applications, it will be permissible to use other materials of construction which are inert to the gas being heated or to reaction with silicia, for example, carbon, alumina, clays, silicon carbide and the like, and which are refractory at the temperature employed.

In its broad sense, the process of the invention comprises passing a gas stream through an annular heating zone having for its outer wall a fused quartz tube and for its inner wall a core-forming inert structure, and supplying heat to the annular heating zone for heating the gas stream flowing therethrough to an elevated temperature. The process of the invention provides a much superior utilization of the available radiant energy.

While the annular heating zone concept of the invention is applicable to furnace structures which utilize a translucent fused quartz outer tube, the preferred embodiment of the invention employs as the outer tube transparent fused quartz with a radiation-absorbing structure within the annular heating zone. With use of the translucent fused quartz tube, the thermal radiation is absorbed in the outer region of the tube and then transferred through the silica wall, thereby raising the temperature thereof to a point where devitrification may occur if the temperature is not carefully controlled. The heat is transported by conduction across the tube wall to its inner surface where the energy is radiated into the annular heating zone or is transferred by forced convection to the flowing fluid stream. Quartz being a poor conductor of heat requires a large temperature driving force to transfer the energy. Where temperatures above 1050° C. become necessary to provide the needed driving force, it will be recognized that problems of devitrification of the quartz are promoted. The efficiency of heat transfer with translucent quartz is poor. In contrast with the use of a transparent outer quartz tube, most of the radiant energy is transmitted without absorption through the tube directly into the annular passageway. For example, in one commercially available transparent quartz transmission is about 95% in the wave length range of 0.2 to 2.5 microns, which includes visible light and a major portion of black body thermal radiation in the infra-red band. By way of contrast, one typical commercial translucent silica has a transmission of only about 20% in this range, and about 10% for the 1 to 2 micron range. To the extent thermal radiation is not transmitted or reflected, it is absorbed. A translucent quartz of the type referred to above, therefore, absorbs a major portion (about 80%) of the radiation in the 0.2 to 2.5 microns range, as contrasted with clear quartz which absorbs only a relatively small amount. It will be recognized that the temperature of the radiation source in the instance of the transparent quartz tube structure will be the temperature of the hot furnace gases, or of the flame source itself, which radiating temperature will be much higher than the radiating temperature of the inside of a translucent quartz conduit. In the latter structure, the radiating source is not the hot furnace gases but rather the considerably lower temperature heated inner surface of the translucent tube itself. As pointed out before, the temperature of the translucent tube must be carefully guarded to avoid early devitrification.

The amount of radiation absorbed or transmitted by translucent quartz will vary somewhat, depending upon the bubble content and surface roughness. In referring to translucent quartz herein, it will be understood that reference is made to a type that will have high absorption in the wave length range where clear quartz has a high transmission. For wave lengths above 3.5 microns both clear and translucent silica absorb infra-red radiation. The major portion of thermal radiation from a hot flame or similar temperature level source occurs in the region from just above visible light, that is 0.8 micron to 3.5 microns and would be transmitted by clear quartz.

The width of the annular heating zone need not vary greatly with an increase in the diameter of the outer quartz tube. It is presently contemplated that the width of the annular heating zone will be less than four inches, and more typically, less than three inches depending on use or absence of internal packing, the type of the outer fused quartz utilized, velocity of the gas, the openness of the packing where used, the temperature of the heat source, etc. Translucent quartz is more easily formed into larger diameter tubes than the transparent variety and where a large diameter tube, say, in excess of 8 inches, e.g., a 24 inch tube, is desired, the translucent variety will be most commonly employed at this time because of its commercial availability. It will be readily seen that the larger diameter outer fused quartz tube of the furnace of the invention will greatly increase the radiant energy received per unit length of heating duct. Generally speaking, the outer quartz tube will be greater than 8 inches in diameter, preferably 10 inches and larger, and the annular heating zone will be three inches or so in width. The annular heating zone is sized to avoid a significant difference in temperature between the gas adjacent the outer wall and that adjacent the inner wall.

It will be appreciated that the rate of heat transfer from the radiation-absorbing structure and inner wall to the flowing gas being heated is controlling and that the heat transferred by radiation is of a sharply higher order since the latter varies as the fourth power of the absolute temperature difference, whereas that for the conduction and convection coefficient varies only as the first power difference of the temperature and the 0.8 power of the mass velocity of the fluid stream.

The transfer of heat by radiation is expressed by the well-known Stefan-Boltzmann equation, Equation 1, (Equation 1)    $Q = AK(T_1^4 - T_2^4)$ and transfer of heat by conduction and convection takes place by the general heat transfer equation as set forth in Equation 2.

(Equation 2)    $Q = AC(t_1 - t_2)$

Q = heat transferred in thermal units per hour
$T_1$, $t_1$ = high level temperature
$T_2$, $t_2$ = low level temperature
A = area of heat transfer surface
K and C = appropriate coefficients.

The importance of the large amount of heat exchange area A provided internally which serves to both directly absorb the radiant energy transmitted and directly transfer the heat to the gas flowing without requiring intermediate conduction through an outer wall of low thermal conductivity and limited heat transfer surface per unit length of conduit, as required by the prior art, can be appreciated readily. The large internal radiation-absorbing and heat-exchange area A and resulting higher heat transfer rates, permits lower temperatures to be employed, which is particularly important for the outer fused quartz conduit, since it minimizes problems of devitrification and structural strength and, thereby, leads to a greatly extended life when using the concept of the invention.

The combination of the large internal area and the higher efficiency of the annular zone heating concept increases the overall coefficient and rate of heat transfer materially above that possible by structures and methods of the prior art. The result is that much greater quantities of heat can be transferred in substantially shorter lengths of heating conduit than heretofore possible.

The radiation-absorbing surfaces may be formed of various materials, including silica, alumina, zirconia, carbon, silicon carbide, alumina-silicates, clay, ceramic, refractory metal oxides and carbides, aluminates, and silicates. The radiation-absorbing structure in some instances is formed of low density, foamed compositions. In a preferred embodiment, the radiation-absorbing surfaces are provided by randomly disposed open packings. In a still further embodiment, the radiation-absorbing structures comprise a plurality of elongated rods which may be either tubular or solid, and which rods are formed of radiation-absorbing materials disposed longitudinally within the annular heating zone. The elongated rods may be circular, or, in other embodiments, non-circular in cross-section, or various cross-sections providing a sizable external area. In one instance the annular heating zone has for its inner wall an elongated, cylindrical member having a plurality of outwardly-extending fins, which fins serve as radiation-absorbing and heat exchange surfaces.

The advantages derived from the improved structure and method of the invention may be translated to more fluid being heated per length of heating conduit or, conversely, to a shorter length of heating structure for the same duty. This, in turn, permits the erection of smaller and lower cost furnaces, and leads to significantly reduced maintenance costs. The ability to transfer a substantial amount of the total heat supplied as radiant energy directly into the heating zone and the avoidance of having to transfer the heat through the outer silica wall by conduction, as required by the prior art, permits lower temperatures of the outer silica wall and reduces devitrification problems, thereby greatly extending the life of the silica tubing, which has been a severe problem until now.

The method and structure of the invention are particularly suitable for the heating of various volatile inorganic halides to elevated temperatures. Typically, the halides heated in the conduit structure of the invention are relatively low boiling having boiling points up to around 500° C., usually less than 400° C. It is particularly advantageous to heat molecules of symmetrical structure, such as boron trichloride, silicon tetrachloride, aluminum trichloride, and titanium tetrachloride in the process of the invention. The process may also be employed for the heating of the various halogens in elemental form, for example, bromide, chlorine, and iodine, or their acids, such as hydrogen bromide, hydrogen chloride, and hydrogen iodide. The process is especially suitable for the heating of various metallic halides, in particular the fluorides, chlorides, bromides, and iodides of aluminum, boron, iron, titanium, silicon, vanadium, tungsten and zirconium.

The structure and process may also be utilized for the heating of such noncorrosive gases as nitrogen, hydrogen and neon. Other prospective inorganic halide fluid streams that are heated to advantage include the fluorides, chlorides, bromides and iodides of beryllium, bismuth, gallium, germanium, indium, mercury, molybdenum, and uranium. Other low boiling halides are those of niobium, osmium, rhenium, and the halides of phosphorous including the bromide, chloride, and iodide. Oxygen may also be heated in the structure of the invention.

Other objects and advantages of the structure and method of the invention will become more apparent from the following description and drawings, wherein:

FIG. 1 is a schematic longitudinal sectional view of one embodiment of the quartz tube conduit structure of the invention taken along line 2—2 of FIG. 2;

FIG. 2 is a cross-sectional view taken along line 2—2 of FIG. 1;

FIG. 3 presents five sectional views of alternative radiation-absorbing rod structures that may be employed in the quartz tube conduit structure of FIGS. 1 and 2;

FIG. 4 is a schematic vertical sectional view of still another form of the quartz tube conduit structure of the invention taken along line 4—4 of FIG. 5;

FIG. 5 is a horizontal sectional view taken along line 5—5 of FIG. 4;

FIG. 6 is a schematic longitudinal sectional view of a still another embodiment of the quartz tube conduit structure of the invention taken along line 6—6 of FIG. 7; and FIG. 7 is a horizontal sectional view taken along line 7—7 of FIG. 6.

The quartz tube conduit structure of the invention illustrated in the several figures are usable in conventional furnaces, which may be provided with gas burners whose exhaust gases empty into the interior of the furnace, therein providing radiant energy for the heating of the gas stream passing through the quartz tube structure. Alternatively, as known in the art, the furnace may be heated by electrical heaters located on the side walls of the furnace adjacent to the quartz tube conduits, or directly around the tubes.

For illustration purposes, the furnace of the invention described in detail hereafter is a structure which utilizes a radiation-transparent outer tube. It will be appreciated, as described before, that the concept of the invention also includes radiation-absorbing fused quartz for the outer tube, with or without a plurality of radiation-absorbing surfaces within the annular heating zone.

In the preferred embodiment of FIGS. 1 and 2 the conduit structure of the invention utilizes an outer, radiation-transparent fused quartz tube 10 which serves as the outer wall of an annular heating zone 11, the inner wall of which is defined by a closed tubular member 14. The tubular member 14 may, as illustrated in FIGS. 1 and 2, be formed of radiation-transparent quartz, or, alternatively, of a radiation-absorbing quartz. The tubular member 14 in being closed at its opposite ends assures that the gas flow is through the annular heating zone 11. In the particular form of the structure of the invention illustrated in FIGS. 1 and 2, the plurality of radiation-absorbing surfaces within the annular heating zone 11 is provided by several longitudinal-extending rods 12 formed of radiation-absorbing material such as silica, alumina, a ceramic material, and the like. The rods 12 are arranged in two concentric circles with the rods of the respective circles being offset with respect to the rods of the adjacent circle, thus assuring greater absorption of reflected radiation. The elongated rods 12 of FIGS. 1 and 2 may be open tubes or rods of solid cross-section. In the particular embodiment illustrated, the rods are tubular, thus permitting the flow of gas through as well as around the respective rods 12.

The longitudinally-extending rods 12 may take various forms, as illustrated in the five embodiments of FIG. 3, including the cross structure of FIG. 3–a, the L structure of FIG. 3–b, the crescent structure of FIG. 3–c, the square tubular structure of FIG. 3–d, and the T structure of FIG. 3–e. All five embodiments of FIG. 3 will be made of radiation-absorbing material.

A still further embodiment is illustrated in FIGS. 4 and 5, and like that of the preceding structure of FIGS. 1 and 2, comprises an outer, radiation-transparent fused quartz tube 10, which defines the outer wall of the annular heating zone 11. The inner wall of the annular heating zone 11 is provided by a radiation-absorbing cylindrical structure having a solid cross-section. The annular heating zone 11 in this embodiment is filled with radiation-absorbing packings 40, which may take the form of Raschig rings, Berl saddles, and other known packing forms. In this partciular embodiment, substantially no radiation will reach the inner cylindrical structure.

A still third form of the quartz tube structure of the invention is illustrated in FIGS. 6 and 7. This embodiment, as the previous two, employs an outer, radiation-transparent fused quartz tube 10, which provides the outer wall of the annular heating zone 11. The inner wall of the annular heating zone 11 is provided by an elongated, cylindrical member 60 having a plurality of outwardly-extending fins which serve as a radiation-absorbing surface within the annular heating zone 11. The tapered structure of the several fins furthers the absorption of reflected radiation.

Radiant energy passes through the outer transparent fused quartz tube, and is absorbed in striking the plurality of radiation-absorbing surfaces positioned within the annular heating zone and, accordingly, raises the temperature of the surfaces from which the heat is then tranmitted by conduction and convection to the gas flowing past. By employing a plurality of radiation-absorbing members, whether it be longitudinally extending rods, or packings, reflected energy not absorbed initially will be likely absorbed by adjacent members. The several proposed radiation-absorbing members are open in structure so as to minimize obstruction to flow of gas being heated through the annular heating zone and to provide a large amount of heat exchange area. The employment of an annular heating zone avoids the presence of a core of gas shielded from radiation by the outwardly-lying radiation-absorbing structures, and which core in being relatively unheated would be at a lower temperature. The annular heating zone thus asures that substantially all the gas flowing therethrough is exposed to heated radiation-absorbing structures. The annular heating zone is sized to assure that all or nearly all of the radiation-absorbing surfaces will receive direct or reflected radiation. It will be appreciated that to the extent that the inner-lying radiation-absorbing surfaces are not heated to the temperature of the outer adjacent structure, there will be a lessening of the heating of the gas stream flowing through the annular heating zone.

The foregoing description for illustration purposes has been directed to a furnace structure utilizing radiation-transparent fused quartz as the outer wall for the annular heating zone. The concept of the invention is not limited to the use of radiation-transparent quartz and in many applications, the outer wall will be formed of a radiation-absorbing fused silica (quartz). The latter variety of fused silica is more readily formed into large-sized conduits than the substantially bubble-free transparent quartz, and is considerably less expensive. In the use of radiation-absorbing fused silica for the outer tube, open packing such as Raschig rings or other multi-surface radiation absorbing structure may optionally be employed in the annular heating zone. Even opaque fused quartz will transmit some radiant energy and it may be beneficial to locate an absorption structure within the annular heating zone to capture this energy. Additionally, an open radiation-absorbing structure (e.g., Raschig rings) will promote turbulent flow and mixing of the gas stream and also serve to capture reradiated energy from the inner face of the outer radiation-absorbing fused quartz tube, thus heating the internal structure and providing energy for transfer by conduction and convection to the flowing gas stream. In one design employing a radiation-absorbing fused quartz tube outer tube, the tube has a diameter of 10 inches, and in larger sizes may be in the range of 14 to 24 inches, and the annular heating zone generally has a width of three inches or less with the heating zone containing a light-weight, open radiation-absorbing packing. The absorbing characteristic of fused quartz may be enhanced by the incorporation of radiation-absorbing materials such as titanium dioxide and other metallic oxides, silicates and such. These may be incorporated in the body or applied to the surface.

It will be apparent to those skilled in the art that variations are possible to the foregoing described structure and method.

I claim:

1. In a furnace of the type employing a fused quartz conduit for heating a gas stream, the improvement comprising:
 an annular heating zone open at its opposite ends to the flow of gas therethrough and having for its outer wall a fused quartz conduit and a corrosion-resistant inner wall, said annular zone providing the passage for the gas being heated.

2. A furnace in accordance with claim 1 wherein the outer tube is formed of a substantially radiation-transparent quartz.

3. A furnace in accordance with claim 1 wherein the outer tube is formed of a substantially radiation-absorbing quartz.

4. A furnace in accordance with claim 1 wherein the annular heating zone houses a plurality of radiation-absorbing surfaces provided by structure open to the flow of the gas stream.

5. In a furnace employing a fused quartz conduit for heating a gas stream, the improvement comprising:
 an outer, substantially radiation-transparent fused quartz tube;
 an annular heating zone having as its outer wall the foregoing radiation-transparent fused quartz tube open at its opposite ends to the flow of gas therethrough; and
 within said annular heating zone, a plurality of radiation-absorbing surfaces provided by structure open to the flow of the gas stream.

6. A furnace in accordance with claim 5 wherein the radiation-absorbing surfaces are formed of a material selected from a group consisting of silica, alumina, zirconia, carbon, silicon carbide, alumina-silicate, clay, ceramic, refractory metal oxides and carbides, aluminates and silicates.

7. A furnace in accordance with claim 5 wherein the radiation-absorbing structure is formed of a low-density, foamed composition.

8. A furnace in accordance with claim 5 wherein the plurality of radiation-absorbing surfaces are provided by randomly disposed open packings.

9. A furnace in accordance with claim 8 wherein the open packing is selected from the group consisting of Raschig rings, Lessing rings, spiral rings, cross partition rings, Berl saddles, Intalox saddles, spheres, cylinders, pieces and chunks.

10. A furnace in accordance with claim 5 wherein the radiation-absorbing structure comprises a plurality of elongated rods formed of radiation-absorbing material disposed longitudinally within said annular heating zone.

11. A furnace in accordnace with claim 10 wherein the elongated rods are non-circular in cross-section.

12. A furnace in accordance with claim 10 wherein the elongated rods are tubular.

13. A furnace in accordance with claim 10 wherein the elongated rods have a solid cross-section.

14. A furnace in accordance with claim 5 wherein the annular heating zone has for its inner wall an elongated, cylindrical member having a plurality of outwardly-extending fins which serve as the radiation-absorbing surfaces within the annular heating zone.

15. In a furnace of the type employing a fused quartz conduit for heating a gas stream, the improvement comprising:
 an outer, substantially radiation-absorbing fused quartz tube; and
 an annular heating zone open at its opposite ends to the flow of gas therethrough having as its outer wall the foregoing radiation-absorbing fused quartz tube and a corrosion-resistant inner wall spaced inwardly of the quartz tube.

16. A furnace in accordance with claim 15 wherein the annular heating zone houses a plurality of radiation-absorbing surfaces provided by structure open to the flow of the gas stream.

17. A furnace in accordance with claim 16 wherein the radiation-absorbing surfaces are formed of a material selected from a group consisting of silica, alumina, zirconia, carbon, silicon carbide, alumina-silicate, clay, ceramic, refractory metal oxides and carbides, aluminates and silicates.

18. A furnace in accordance with claim 16 wherein the radiation-absorbing structure is formed of a low-density, foamed composition.

19. A furnace in accordance with claim 16 wherein the plurality of radiation-absorbing surfaces are provided by randomly disposed open packings.

20. A furnace in accordance with claim 19 wherein the open packing is selected from the group consisting of Raschig rings, Lessing rings, spiral rings, cross partition rings, Berl saddles, Intalox saddles, spheres, cylinders, pieces and chunks.

21. A furnace in accordance with claim 16 wherein the radiation-absorbing structure comprises a plurality of elongated rods formed of radiation-absorbing material disposed longitudinally within said annular heating zone.

22. A method for heating of a gas stream having low thermal radiation absorptivity, said method comprising:
 passing the low radiation absorption gas stream through an annular heating zone having for its outer wall a fused quartz tube and for its inner wall a core-forming inert structure, said tube being open at its opposite ends to the flow of gas therethrough; and
 supplying heat to the annular heating zone for heating the gas flowing therethrough to an elevated temperature.

23. A method in accordance wtih claim 22 wherein the tube forming the outer wall of the annular heating zone is made of a substantially radiation-transparent quartz.

24. A method in accordance with claim 22 wherein the tube forming the outer wall of the annular heating zone is made of a substantially radiation-absorbing translucent quartz.

25. A method in accordance with claim 22 wherein the annular heating zone houses a plurality of radiation-absorbing surfaces provided by structure open to the flow of the gas stream.

26. A method in accordance with claim 22 wherein the gas being heated comprises molecules of symmetrical structure.

27. A method in accordance with calim 22 wherein the gas being heated is a volatile inorganic halide.

28. A method in accordance with claim 22 wherein the gas being heated is a metalic halide from the group consisting of aluminum, boron, iron, titanium, silicon, vanadium and zirconium.

29. A method in accordance with claim 22, wherein the gas being heated is oxygen.

30. A method in accordance with claim 22, wherein the gas being heated is a hydrogen halide selected from the group consisting of hydrogen chloride, hydrogen bromide, and hydrogen iodide.

31. A method in accordance with claim 22, wherein the gas being heated is essentially a non-radiation absorbing material.

32. A method for heating of a gas stream having a low thermal radiation absorptivity, said method comprising:
passing the low radiation absorbing gas stream through an annular heating zone having for its outer wall a substantially radiation-transparent fused quartz tube and containing therein a plurality of radiation-absorbing surfaces provided by structure open to flow of the gas stream, said tube being open at its opposite ends to the flow of gas therethrough;
exposing the heating zone to a source of thermal radiation and absorbing the radiant energy on the radiation-absorbing surfaces to effect the heating thereof; and
transferring heat from the heated surfaces to the gas stream via conduction and convection.

33. A method in accordance with claim 22, wherein the gas stream being heated comprises titanium tetrachloride.

34. A method in accordance with claim 32, wherein the gas stream being heated comprises titanium tetrachloride.

35. A furnace in accordance with claim 15 wherein the fused quartz conduit has a diameter in excess of 8 inches and the annular heating zone has a width not larger than 3 inches.

36. A furnace in accordance with claim 15 wherein the fused quartz conduit has a diameter in excess of 10 inches and the annular heating zone has a width not larger than 4 inches.

37. A furnace in accordance with claim 36 wherein the fused quartz conduit has a diameter in the range of 14 to 24 inches.

38. A furnace in accordance with claim 5 wherein the fused quartz conduit has a diameter in excess of 8 inches and the annular heating zone has a width not larger than 3 inches.

39. A furnace in accordance with claim 5 wherein the fused quartz conduit has a diameter in excess of 10 inches and the annular heating zone has a width not larger than 4 inches.

40. A furnace in accordance with claim 39 wherein the fused quartz conduit has a diameter in the range 14 to 24 inches.

References Cited

UNITED STATES PATENTS

| | | | |
|---|---|---|---|
| 1,464,580 | 8/1923 | Philipon | 263—20 |
| 2,115,769 | 5/1938 | Harris. | |
| 2,138,321 | 11/1938 | Bratasianu | 263—42 X |
| 2,281,206 | 4/1942 | Schoen. | |
| 2,614,028 | 10/1952 | Schaumann | 165—104 X |
| 2,709,128 | 5/1955 | Krause | 165—180 X |
| 2,910,285 | 10/1959 | Harris. | |
| 3,020,032 | 2/1962 | Casey | 263—42 |

JOHN J. CAMBY, Primary Examiner

U.S. Cl. X.R.

165—180; 263—41